United States Patent
Agapi et al.

(10) Patent No.: US 7,289,962 B2
(45) Date of Patent: Oct. 30, 2007

(54) COMPRESSED LIST PRESENTATION FOR SPEECH USER INTERFACES

(75) Inventors: Ciprian Agapi, Hollywood, FL (US); James R. Lewis, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 09/894,608

(22) Filed: Jun. 28, 2001

(65) Prior Publication Data

US 2003/0004725 A1    Jan. 2, 2003

(51) Int. Cl.
*G10L 15/18*    (2006.01)
*G10L 11/00*    (2006.01)
*G06F 17/28*    (2006.01)

(52) U.S. Cl. .......................... 704/275; 704/7; 704/257; 704/270.1

(58) Field of Classification Search ................ 704/270, 704/270.1, 275, 8, 10, 7, 271, 257
See application file for complete search history.

(56) References Cited

U.S. PATENT DOCUMENTS

| | | | |
|---|---|---|---|
| 5,220,625 A * | 6/1993 | Hatakeyama et al. ....... | 715/809 |
| 6,385,602 B1 * | 5/2002 | Tso et al. ...................... | 707/3 |
| 6,522,738 B1 * | 2/2003 | Cruickshank et al. .. | 379/201.03 |
| 6,567,800 B1 * | 5/2003 | Barrera et al. ................. | 707/4 |
| 6,658,386 B2 * | 12/2003 | Kemble et al. ............. | 704/270 |
| 6,772,173 B1 * | 8/2004 | McGee et al. ........... | 707/104.1 |
| 6,985,950 B1 * | 1/2006 | Hanson et al. .............. | 709/226 |
| 2002/0010000 A1 * | 1/2002 | Chern et al. ................. | 455/517 |
| 2002/0083090 A1 * | 6/2002 | Jeffrey et al. ................ | 707/500 |
| 2003/0158738 A1 * | 8/2003 | Crosby et al. .............. | 704/275 |

OTHER PUBLICATIONS

Pitt et al. An Improved Auditory Interface for the Exploration of Lists, Nov. 9-13, 1997, Proceedings of the fifth ACM international conference on Multimedia, pp. 51-61.*

* cited by examiner

*Primary Examiner*—Tālivaldis Ivars Šmits
*Assistant Examiner*—Thomas E. Shortledge
(74) *Attorney, Agent, or Firm*—Akerman Senterfitt

(57) ABSTRACT

A list presentation method. The list presentation method can include the steps of: dynamically grouping selected items in a list based on sequentially positioned symbols in the items which are common to one another; labeling each group of selected items; audibly presenting each group label through a speech user interface; and, responsive to a selection of one of the presented group labels, presenting through the speech user interface items in a group corresponding to the selected group label.

17 Claims, 4 Drawing Sheets

COMPRESSED LIST PRESENTATION FOR SPEECH USER INTERFACES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates to the field of online voice response systems and more particular to speech user interfaces for use with online voice response systems.

2. Description of the Related Art

Speech systems are systems which can process speech both as input and output. Speech input can be processed into computer recognizable text through well-known speech recognition technology. Similarly, speech output can be generated through well-known speech synthesis technology. One type of speech system, the online voice processing system, has become widespread in recent years. Online voice processing systems are data processing systems which can process speech input and provide audio output, both through an audio user interface. Typical online voice processing systems are deployed in a telephony setting where users interact with the online voice processing system through the use of a telephone.

Generally, online voice processing systems can provide speech prompts to a user as required by the data processing system by speech synthesizing text and transmitting the speech synthesized text over a public switched telephone network (PSTN) to the user. Notwithstanding, online voice processing systems are not limited to use over a PSTN and other online voice processing systems have been integrated with packet switched network voice transport technology, such as Voice over IP (VoIP) technology. In any case, users can respond to online voice processing system speech prompts by "speaking" to the online voice processing system over the PSTN. Online voice processing systems can speech recognize user speech thereby producing speech recognized text which can be processed by the data processing system.

Oftentimes, online voice processing systems prompt users with a list of menu choices. For example, in an online voice processing system for use with a library catalog data processing system, users can be prompted with lists of books which satisfy a searching criteria such as "Fiction" or "Sports". Human memory limitations can limit the effectiveness of such an online voice processing system, however, where lists include many entries. For example, where the resulting list of books exceeds a dozen entries, in most cases users will not recall each item included in the list. Accordingly, what is needed is a method for compressing the presentation of lengthy lists in an online voice processing system to facilitate selection of list items by users.

SUMMARY OF THE INVENTION

The present invention solves the problem of presenting items in a list through a speech user interface by providing a compressed list presentation system, apparatus and method which overcomes the deficiencies of the prior art. In particular, the present invention can include a method for automatically compressing the presentation of lengthy lists in an interactive voice response system in order to facilitate the selection of list items by users. Specifically, a list presentation method in accordance with the inventive arrangements can include the steps of: grouping selected items in a list based on sequentially positioned symbols in the items which are common to one another; labeling each group of selected items; audibly presenting each group label through a speech user interface; and, responsive to a selection of one of the presented group labels, presenting through the speech user interface items in a group corresponding to the selected group label.

In one aspect of the present invention, the grouping step can include the steps of: parsing a list of items into component symbols; identifying among the items in the list, sequentially positioned component symbols which are common as between at least two of the items; and, associating in a group the at least two items. Additionally, the labeling step can include the steps of: forming a label based on the sequentially positioned component symbols which are common as between the at least two of the items; and, assigning the formed label to the association.

In another aspect of the present invention, the grouping step can include the steps of: sorting the list alphabetically based on initial symbols in the items in the list; further sorting the list alphabetically based on subsequent sequentially encountered symbols in the items in the list; and, forming groups based the initial and subsequent sequentially encountered symbols in the items in the list which are common as between at least two of the items. Additionally, the method can include the step of ignoring article symbols when performing the sorting steps. Finally, the labeling step can include the step of forming a label comprising the initial and subsequent sequentially encountered symbols in the items in the list which are common as between at least two of the items. Importantly, the method can be applied recursively to groups of items. In particular, if any group produced by the method contains too many items, the method can be re-applied to the group to reduce the size of the group.

A list presentation system in accordance with the inventive arrangements can include: grouping component for grouping selected items in a list based on sequentially positioned symbols in the items which are common to one another; a group labler for labeling each group of selected items; and, a presentation component for audibly presenting through a speech user interface each group label and items in a group corresponding to a selected group label. The grouping component can include: a parser for parsing a list of items into component symbols; a comparator for identifying among items in a parsed list, sequentially positioned component symbols which are common as between at least two of the items; and, an associator for associating in a group the at least two items. Alternatively, the grouping component can include: a sorter for sorting a list of items alphabetically both based on initial symbols in the items in the list and based on subsequent sequentially encountered symbols in the items in the list; and, an associator for associating in a group items in the sorted list having common initial and subsequent sequentially encountered symbols. Finally, the list presentation system can include a symbol exclusion component for preventing the sorter from considering symbols such as articles when sorting a list of items.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a compressed list presentation system, method and apparatus for use with a speech user interface. The present invention can efficiently process a list of items to be presented to a user through a speech user interface. Unlike prior art speech user interface list presentation methods which non-dynamically present each item in a list to a user, the present invention intelligently and dynamically groups selected list items, formulates a group label for each group and presents the group labels to the user through the speech user interface. Subsequently, the list items in the group are presented to the user through the speech user interface only when the user selects a particular group by specifying a corresponding group label. In this way, users are presented with shorter, compressed lists through the speech user interface which enhances the usability of a speech system which incorporates the present invention.

Figure 1A:
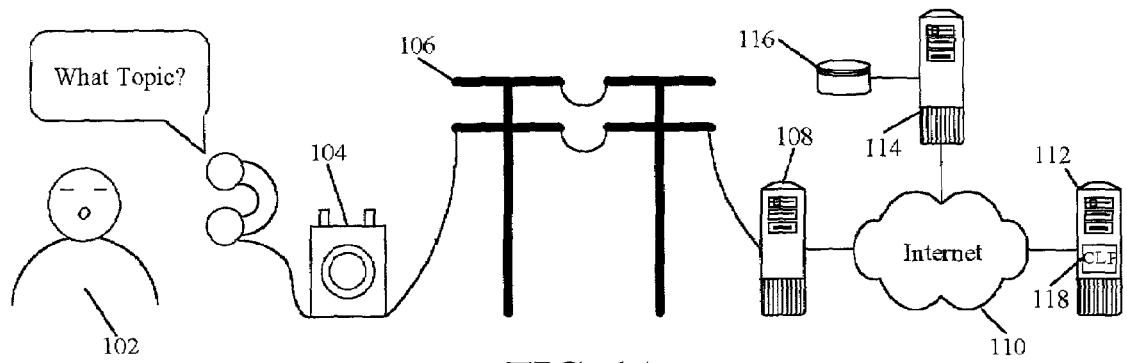
FIGS. 1A-1F, taken together, are a pictorial drawing illustrating a compressed list presentation method and system in accordance with the inventive arrangements.

FIGS. 1A-1F, taken together, collectively illustrate a list presentation system and method in accordance with the inventive arrangements. In FIG. 1A, a user 102 interacts with a speech system which includes a speech server 112 and a back-end data processing system 114 communicatively linked to one another through packet-switched network 110. Notably, though shown in FIGS. 1A-1F as the "Internet", the invention is not limited in this regard and any network topology can suffice, for example a private local area network. Moreover, the invention can be performed in a stand-alone or in an embedded system. In any case, the back-end data processing system 114 can include one or more databases in which data can be stored for use by the data processing system 114. User 102 can interact with the speech system using a conventional telephone handset 104 over a public switched telephone network (PSTN) 106. Notably, telephony gateway 108 can bridge communications between the packet-switched network 110 and the PSTN 106.

In operation, user 102 can establish a connection with the speech server 112 over the PSTN 106. Specifically, the telephony gateway 108 can configure a telephone call originating from the user 102 and maintain the call as necessary. Moreover, the telephony gateway 108 both can forward data received over the PSTN 106 to devices in the packet-switched network 110, and can forward data received over the packet-switched network 110 to nodes in the PSTN 106. As will be apparent to one skilled in the art, telephony gateways are conventional devices well-known in the art and typically are used for establishing and maintaining telephone calls between a PSTN-based node and a packet-switched network-based device. Moreover, alternative gateway configurations are possible for instance a gatekeeper can be provided to perform call maintenance where the gateway digitizes and packetizes audio streams.

As shown in FIG. 1A, the speech system can prompt the user 102 for information. For example, the speech system can be library catalog system and the speech server 112 can prompt the user 102 to request a topic for which the data processing system 114 can search the database 116. Specifically, the speech server 112 can generate a speech synthesized prompt and transmit the prompt over the network 110 to the telephony gateway 108. The telephony gateway 108, in turn, can transmit the prompt over the PSTN 106 to the user 102 via handset 104.

Figure 1B:
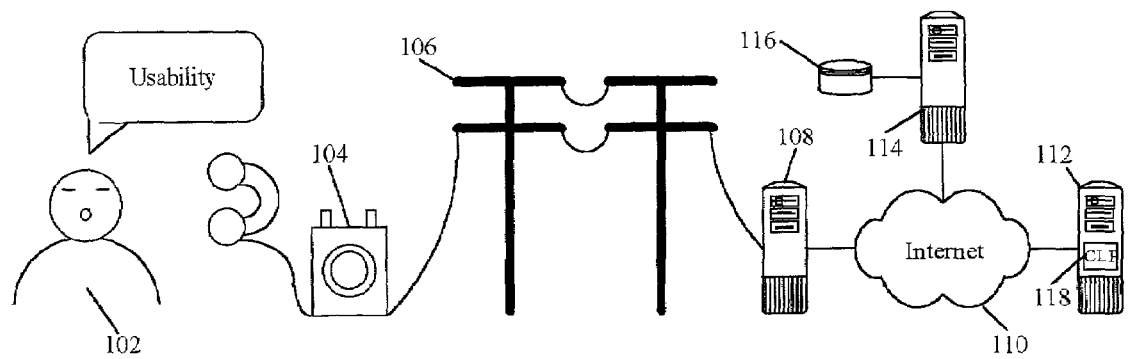

The user can respond to the prompt by requesting that the speech server query the data processing system for all items relating to "Usability" as shown in FIG. 1B. The speech request can be transmitted over the PSTN 106 to the telephony gateway 108 which can digitize and packetize the speech audio request. The telephony gateway 108 can forward the packetized speech audio request over the packet-switched network 110 to speech server 112 which can perform speech recognition operations on the received speech audio data. Once converted to computer recognizable text, the user's request can be forwarded to the back-end data processing system 114 which can process the user's request by querying the database 116.

Figure 1C:
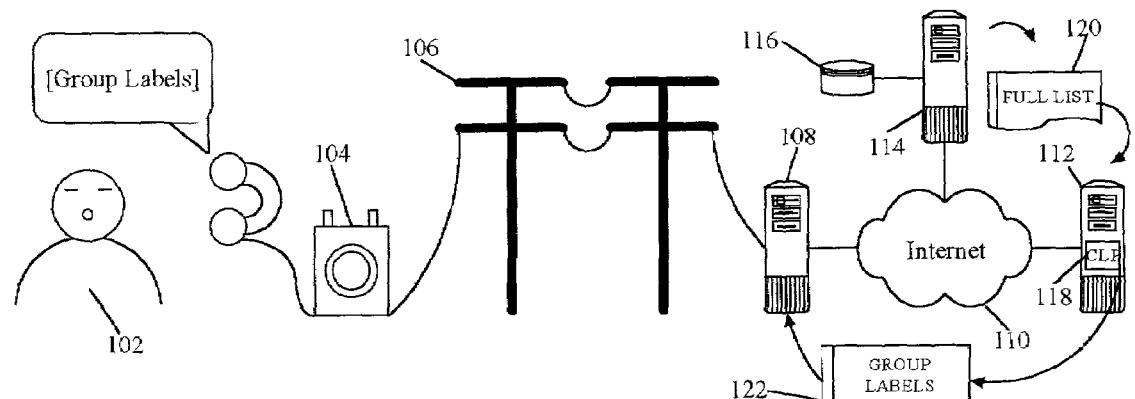

As shown in FIG. 1C, the database 116 can respond by providing a result set in the form of a full list 120 which includes all items which match the query terms provided by the user 102. In the exemplary case, the full list 120 can include all topics relating to "Usability". An exemplary full list 120 is shown in Appendix A. The full list 120 can be extensive and can include numerous entries which, in the absence of the present invention, would be difficult to present through a speech user interface. Thus, in accordance with the inventive arrangements, the full list 120 can be processed by a list presentation system 118 referred to hereinafter as a compressed list processor (CLP).

The CLP 118 can group selected items in the full list 120 based on symbols found to be common among the selected items. Symbols can include graphic elements, words, numbers and other characters or combination of characters. In one aspect of the invention, the CLP 118 can identify words which are common between items in the full list 120. Based on these common words, a sub-set of groups can be generated for which group labels 122 can be created. In particular, the group labels can include the common words which are identified for each group. An exemplary set of group labels is shown in Appendix B.

Notwithstanding, the invention is not limited in this regard and other methods of generating a group label can suffice, for instance, meta-data associated with the items in the group can be used to determine an appropriate group label. In any case, once the group labels 122 have been created, the group labels can be speech synthesized by the speech server 112 and provided over the network 110 to the telephony gateway 108. From the telephony gateway 108, the group labels can be presented to the user 102 over the PSTN 106 via the handset 104.

Figure 1D:
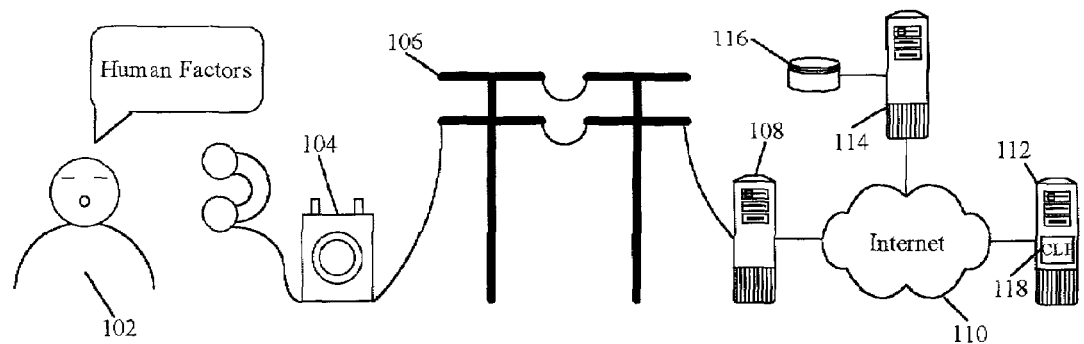
Figure 1E:
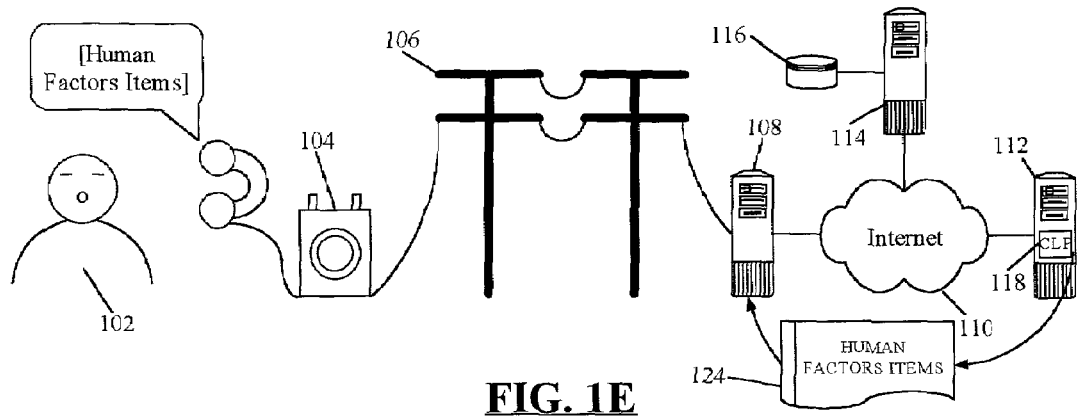
Figure 1F:
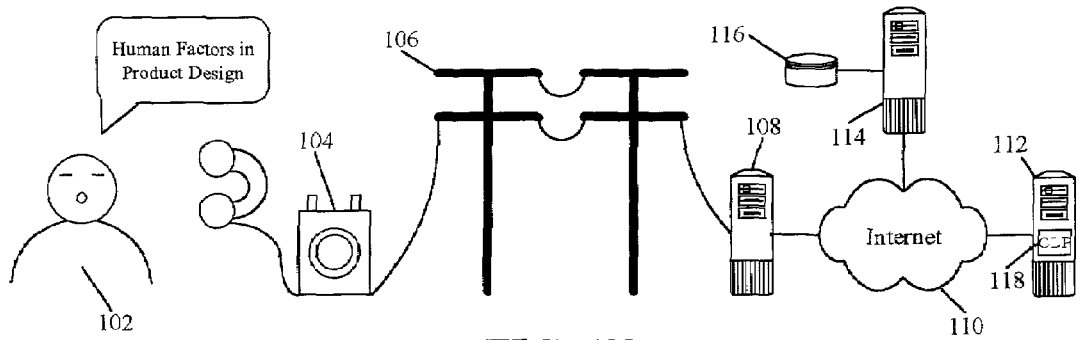

As shown in FIG. 1D, from the presented group labels 122, the user 102 can select a particular group label by speaking the group label itself, though the invention is not limited in regard to the particular method of selecting a group label. Turning to FIG. 1E, once selected, the CLP 118 can generate a list of items 124 in the selected group. As in the case of the group labels 122, can be speech synthesized in the speech server 112 and provided to the telephony gateway 108 over the network 110. Hence, in the example shown, if the user had selected from among the group labels, "Human Factors", a list of items in the Human Factors group (shown in Appendix C) can be provided to the user 102 via the PSTN 106 and telephone handset 104. Finally, as shown in FIG. 1F, the user 102 can select an item from among the list of items 124, for example "Human Factors in Product Design".

Figure 2:
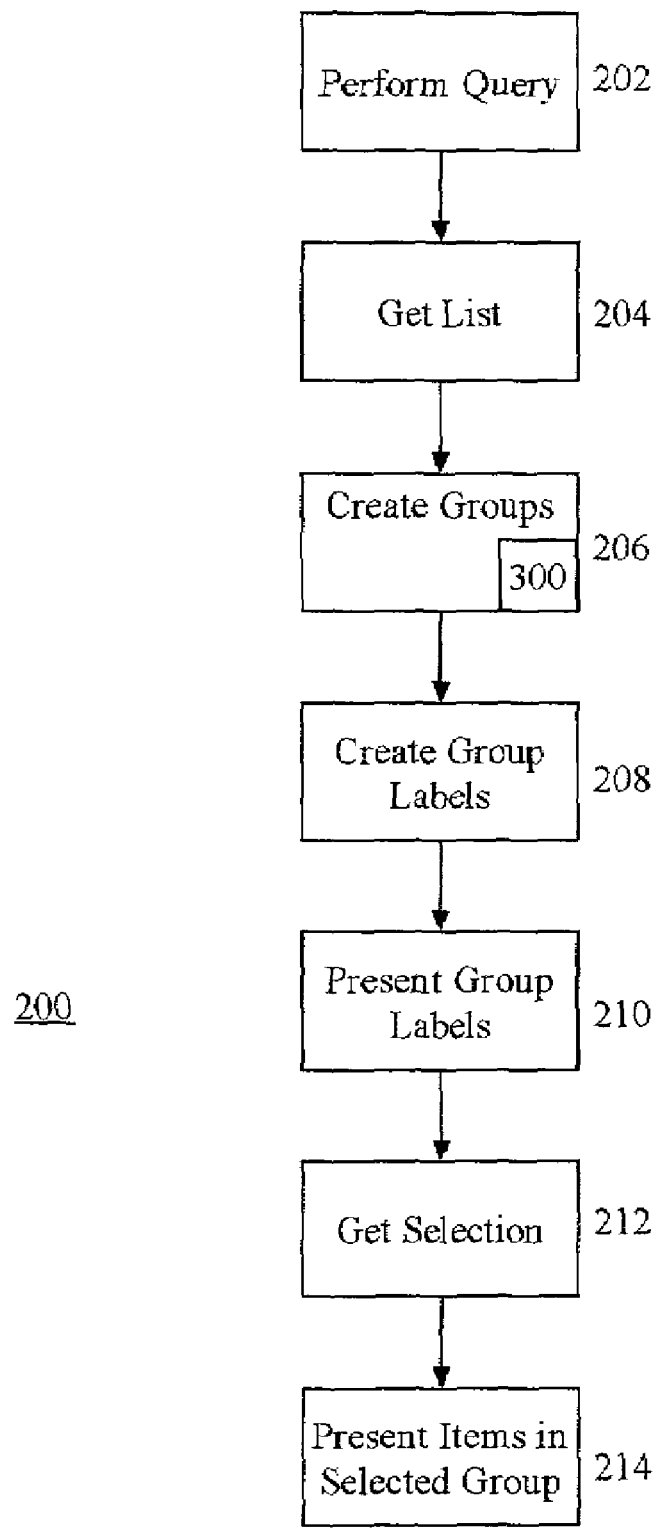
FIG. 2 is a flow chart illustrating a list presentation method configured in accordance with one aspect of the present invention.

FIG. 2 is a flow chart illustrating a list presentation method 200 which can be performed by the CLP 118 of FIG. 1. Beginning in step 202, a query can be performed which can return a full list of query result items in step 204. In step 206, the items can be grouped and in step 208, group labels can be created for each group. In step 210, the group labels can be presented to a user through a speech user interface. In step 212, the user can select a particular group label. In response, in step 214, items included in a group associated with the selected group label can be presented to the user through the speech user interface.

Figure 3:
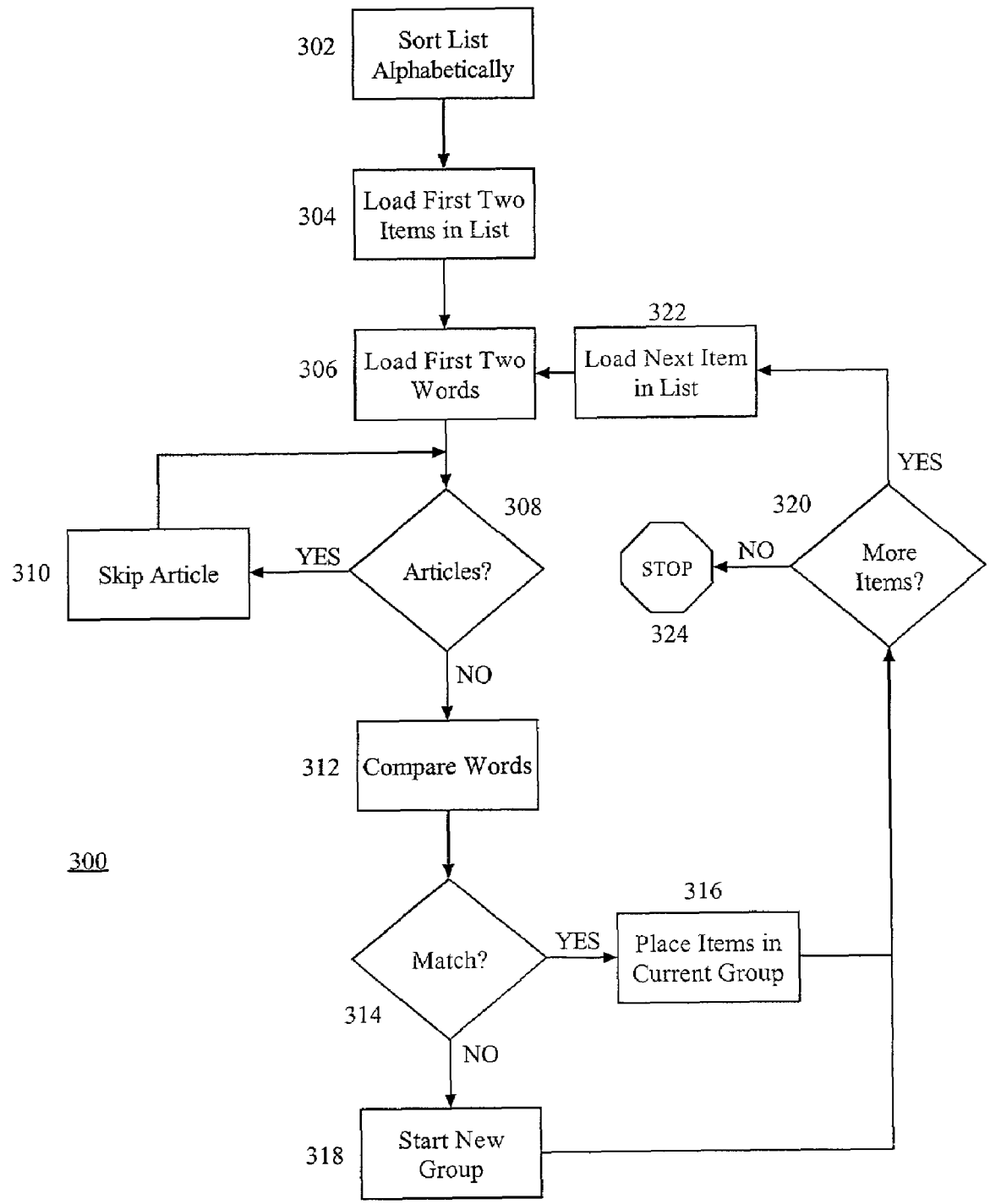
FIG. 3 is a grouping method for use with the list presentation method of FIG. 2.

Importantly, the grouping aspect of the list presentation method 200 can facilitate the presentation of list items to a user through a speech user interface in a manner not previously possible in conventional speech systems. FIG. 3 is a flow chart which illustrates one possible method of grouping items in a list. In reference to FIGS. 1A-1F, a grouping method 300 can be performed in the CLP 118 and can begin in step 302 when a full list 120 is received. Specifically, in step 302, the full list 120 can be sorted, for instance alphabetically by first symbol. As before, symbol can refer not only to word, but also character, group of characters or graphical indicia. In step 304, the first two items in the full list 120 can be loaded. Subsequently, in step 306, the first two symbols can be loaded.

In step 308, grammatical articles can be detected among the two symbols and, if detected, in step 310, the articles can be skipped. In this way, symbols which have little contextual meaning such as "the", "a" and the like can be excluded from the grouping process. In step 312, the symbols can be compared to one another. In step 314, if a match is detected, in step 316 the items can be grouped together. If not match is detected, in step 318, a new group can be created. In any case, in step 320 if more items remain in the full list 120, the next item in the list can be loaded to be compared to the previous item in the list. Subsequently, the process can repeat until no items remain in which the case grouping method can terminate in step 324.

Notably, the method is neither limited to initially loading the first two words nor the first two items in the list. Also, the invention is not limited to sorting alphabetically. Rather, sorting alphabetically can facilitate the grouping process, but failure to sort will not prevent an effective grouping. In fact other grouping methods, such as dynamically identifying common symbols in each list item by parsing individual items and storing the parsed symbols for subsequent comparison can suffice. Still, sorting alphabetically by first word and sequentially comparing words in two items can facilitate the identification of common words from a processing efficiency standpoint.

The present invention can be realized in hardware, software, or a combination of hardware and software. Moreover, the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A computer-implemented list presentation method comprising the steps of:

providing an audible prompt through a speech user interface, said audible prompt instructing a user to provide a speech input designating a search topic;

converting said user-provided speech input into a computer-readable text representation of a topic-indicating phrase corresponding to said search topic;

selecting items from at least one database based on said topic-indicating phrase corresponding to said search topic, each of said selected items comprising a corresponding phrase having at least one word and being selected by identifying within the corresponding phrase at least one word that is common to each other phrase corresponding to a selected item, said at least one common word having a predetermined association with said search topic, wherein the selecting step comprises examining a full list of phrases contained in the at least one database and detecting the at least one common word in each phrase corresponding to a selected item, and wherein selecting step further comprises detecting and ignoring a grammatical article when a grammatical article appears in one of the phrases of the full list;

dynamically grouping said selected items in a list corresponding to said search topic;

labeling each group of said selected items with a corresponding search topic label, each search topic label generated from and comprising the at least one word identified as being common to each phrase corresponding to a selected item;

audibly presenting each group label through said speech user interface; and responsive to a selection of one of said audibly presented group labels, presenting through said speech user interface items in a group corresponding to said selected group label.

2. The list presentation method of claim 1, wherein the grouping step comprises the steps of:

parsing a list of items into component symbols;

identifying among said parsed items sequentially positioned component symbols which are common as between at least two of said items; and, associating in a group said at least two items having said identified component symbols in common.

3. The list presentation method of claim 2, wherein the labeling step comprises the steps of:

forming a label based on said sequentially positioned component symbols which are common as between said at least two of said items; and, assigning said formed label to an association.

4. The list presentation method of claim 1, wherein the grouping step comprises the step of:

sorting said list alphabetically based on initial symbols in said items in said list; further sorting said list alphabetically based on subsequent sequentially encountered symbols in said items in said list; and, forming groups based on said initial and subsequent sequentially encountered symbols in said items in said list which are common as between at least two of said items.

5. The list presentation method of claim 4, further comprising the step of ignoring article symbols when performing said sorting steps.

6. The list presentation method of claim 4, wherein the labeling step comprises the step of forming a label comprising said initial and subsequent sequentially encountered symbols in said items in said list which are common as between at least two of said items.

7. A list presentation system comprising:

a speech user interface for providing an audible prompt that instructs a user to provide a speech input designating a search topic and for converting received user-provided speech input into a computer-readable text representation of a topic-indicating phrase corresponding to said search topic and comprising at least one distinct word;

a selecting component for selecting items from at least one database based on said topic-indicating phrase, each of said selected items comprising a corresponding phrase having at least one word and being selected by identifying within the corresponding phrase at least one word that is common to each other phrase corresponding to a selected item, said at least one common word having a predetermined association with said search topic, wherein the selecting component is configured to examine a full list of phrases contained in the at least one database and to detect the at least one common word in each phase corresponding to a selected item, and wherein the selecting component is further configured to detect and ignore a grammatical article when a grammatical article appears in one of the phrases of the full list;

a grouping component for dynamically grouping said selected items in a list corresponding to said search topic;

a group labeler for labeling each group of said selected items labeling each group of said selected items with a corresponding search topic label, wherein the search topic label is generated by the group labeler from and comprises the at least one word identified as being common to each phrase corresponding to a selected item; and a presentation component for audibly presenting through said speech user interface each group label and items in a group corresponding to a selected group label.

8. The list presentation system of claim 7, wherein said grouping component comprises:

a parser for parsing a list of items into component symbols;

a comparator for identifying among items in a parsed list, sequentially positioned component symbols which are common as between at least two of said items; and, an associator for associating in a group said at least two items.

9. The list presentation system of claim 7, wherein said grouping component comprises:

a sorter for sorting a list of items alphabetically both based on initial symbols in said items in said list and based on subsequent sequentially encountered symbols in said items in said list; and, an associator for associating in a group items in said sorted list having common initial and subsequent sequentially encountered symbols.

10. The list presentation system of claim 9, further comprising a symbol exclusion component for preventing said sorter from considering selected symbols when sorting a list of items.

11. A machine-readable storage having stored thereon a computer program having a plurality of code sections executable by a machine for causing the machine to perform the steps of:

providing an audible prompt through a speech user interface, said audible prompt instructing a user to provide a speech input designating a search topic;

converting said user-provided speech input into a computer-readable text representation of a topic-indicating phrase corresponding to said search topic and comprising at least one distinct word;

a selecting component for selecting items from at least one database based on said topic-indicating phrase, each of said selected items comprising a corresponding phrase having at least one word and being selected by identifying within the corresponding phrase at least one word that is common to each other phrase corresponding to a selected item, said at least one common word having a predetermined association with said search topic, wherein the selecting component is configured to examine a full list of phrases contained in the at least one database and to detect the at least one common word in each phrase corresponding to a selected item, and wherein the selecting component is further configured to detect and ignore a grammatical article when a grammatical article appears in one of the phrases of the full list;

dynamically grouping said selected items in a list corresponding to said search topic;

labeling each group of said selected items with a corresponding search topic label, each search topic label generated from and comprising the at least one word identified as being common to each phrase corresponding to a selected item;

audibly presenting each group label through said speech user interface; and responsive to a selection of one of said audibly presented group labels, presenting through said speech user interface items in a group corresponding to said selected group label.

12. The machine readable storage of claim 11, wherein the grouping step comprises the steps of:

parsing a list of items into component symbols;

identifying among said parsed items sequentially positioned component symbols which are common as between at least two of said items; and, associating in a group said at least two items having said identified component symbols in common.

13. The machine readable storage of claim 12, wherein the labeling step comprises the steps of:

forming a label based on said sequentially positioned component symbols which are common as between said at least two of said items; and, assigning said formed label to an association.

14. The machine readable storage of claim 11, wherein the grouping step comprises the step of:

sorting said list alphabetically based on initial symbols in said items in said list; further sorting said list alphabetically based on subsequent sequentially encountered symbols in said items in said list; and, forming groups based on said initial and subsequent sequentially encountered symbols in said items in said list which are common as between at least two of said items.

15. The machine readable storage of claim 14, further comprising the step of ignoring article symbols when performing said sorting steps.

16. The machine readable storage of claim 14, wherein the labeling step comprises the step of forming a label comprising said initial and subsequent sequentially encountered symbols in said items in said list which are common as between at least two of said items.

17. A list presentation system comprising:

a data processing system;

at least one database searchable by said data processor;

a speech server in communication with data processing system for generating an audible prompt that instructs a user to provide a speech input designating a search topic; and a compressed list processor in communication with said data processing system, the compressed list processor including:

a selecting unit for selecting items from the at least one database based on the designated search topic, each of said selected items comprising a corresponding phrase having at least one word and being selected by identifying within the corresponding phrase at least one word that is common to each other phrase corresponding to a selected item, said at least one common word having a predetermined association with said search topic, wherein the selecting unit is configured to examine a full list of phrases contained in the at least one database and to detect the at least one common word in each phrase corresponding to a selected item, and wherein the selecting unit is further configured to detect and ignore a grammatical article when a grammatical article appears in one of the phrases of the full list, a grouping unit for dynamically grouping said selected items in a list corresponding to said search topic, a labeling unit for labeling each group of said selected items, wherein the search topic label is generated by the labeling unit from and comprises the at least one word identified as being common to each phrase corresponding to a selected item, and a presentation unit for supplying each group label to said speech server which audibly presents each group label to a user and, in response to said user selecting an audibly presented group label, presents items in a group corresponding to said selected group label.

* * * * *